Sheet. 1. 3. Sheets

C. W. Johnson.

Power Press.

Figure 1:
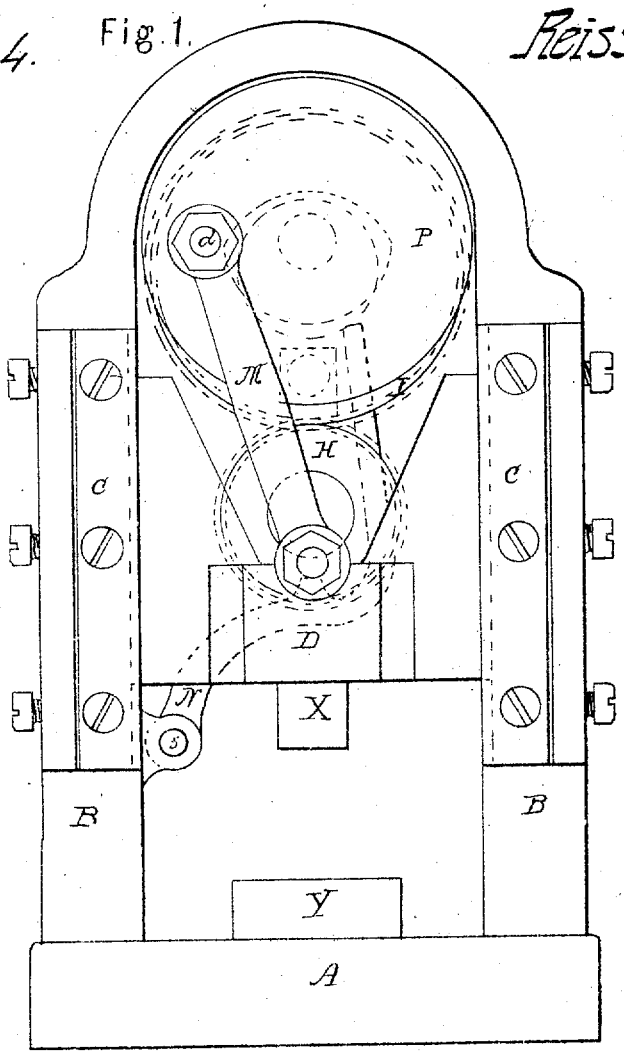

No. 2144. Fig. 1. Reissued Jan. 9. 1866.

Witnesses:

John E. Earle

Rufus Sanford

Inventor:

Charles W. Johnson

C. W. Johnson, Sheet 2. 3 Sheets.

Power Press.

No. 2144. Reissued Jan 9 1866.

Witnesses:

John E. Earle

Rufus Sanford

Inventor:

Charles W. Johnson

Sheet 3. 3 Sheets.
C. W. Johnson.
Power Press.
Fig. 3. No. 2144. Reissued Jan. 9. 1866.
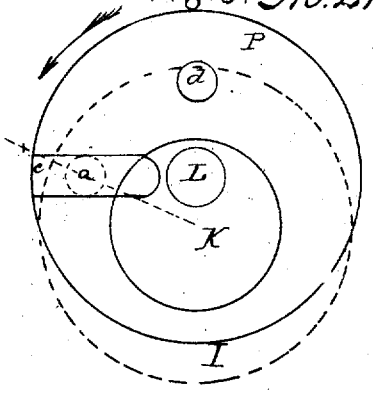
Fig. 4.
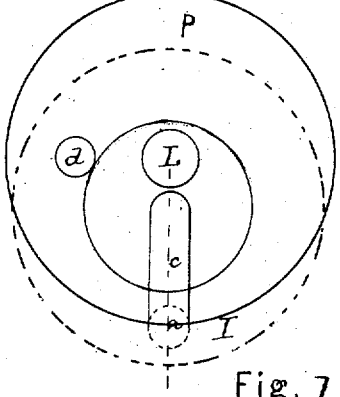
Fig. 5
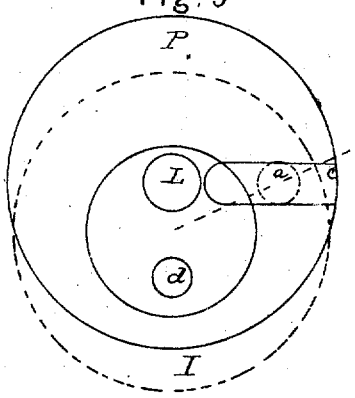
Fig. 6.
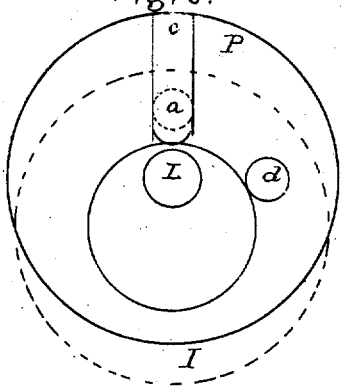
Fig. 7.
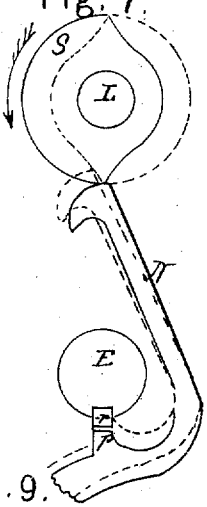
Fig. 8
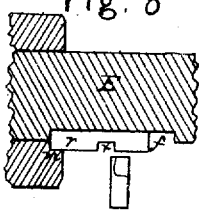
Fig. 9.
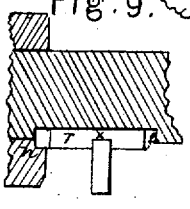
Witnesses:
John E. Earle.
Rufus Sanford
Inventor:
Charles W. Johnson.

UNITED STATES PATENT OFFICE.

CHARLES W. JOHNSON, OF WATERBURY, CONNECTICUT.

IMPROVEMENT IN POWER-PRESSES.

Specification forming part of Letters Patent No. 50,826, dated November 7, 1865; Reissue No. 2,144, dated January 9, 1866.

*To all whom it may concern:*

Be it known that I, CHARLES W. JOHNSON, of Waterbury, in the county of New Haven and State of Connecticut, have invented new and useful Improvements in Power-Presses; and I do hereby declare the following to be a full, clear, and exact description of the same when taken in connection with the accompanying drawings and the letters of reference marked thereon, and which said drawings constitute part of this amended specification, and represent, in—

Figure 2:
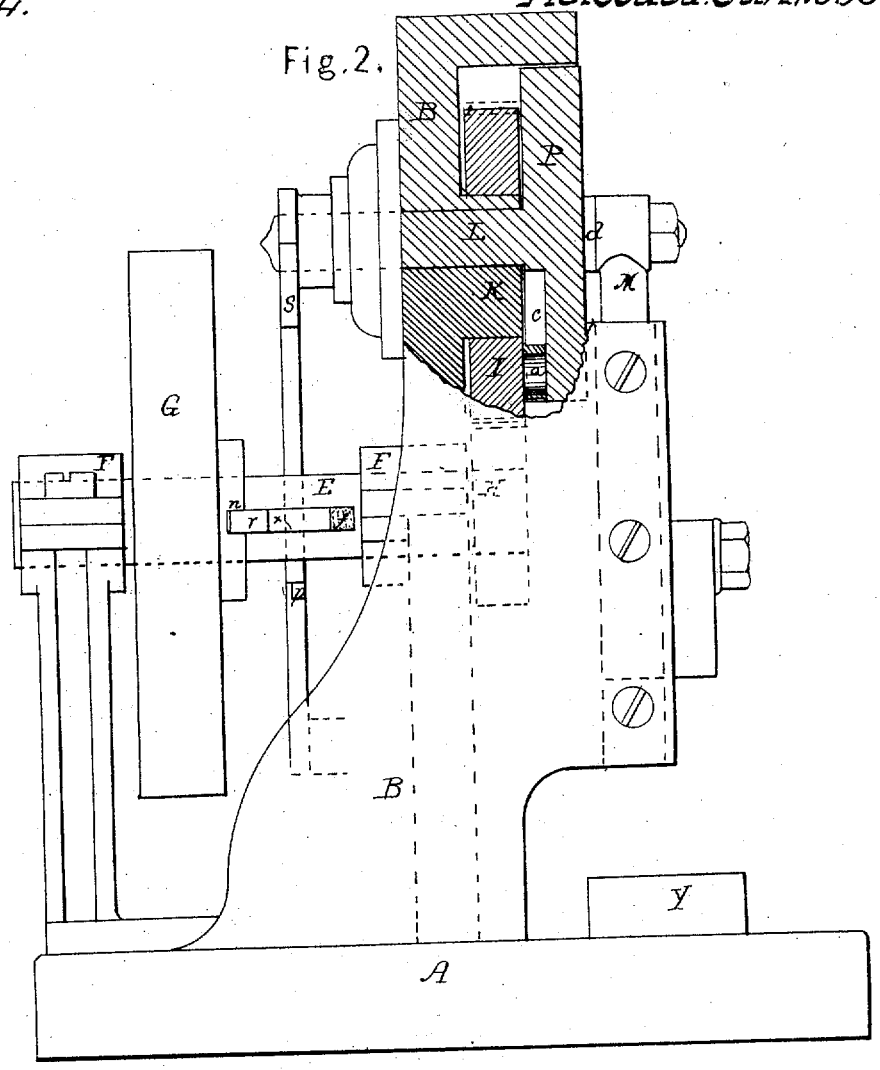

Figure 1, a front view; Fig. 2, a side view, partial section; Figs. 3, 4, 5, and 6, diagrams to illustrate the movement of the slide; and in Figs. 7, 8, and 9, detached views to illustrate the operation of the clutch.

Similar letters indicate like parts.

My invention relates to an improvement in machines for punching, cutting, &c., commonly called "power-presses;" and it consists in a mechanism for operating the slide whereby the upward movement of the slide is made in much less time than the downstroke, by which improvement so much time is saved in each full movement of the slide as the upstroke is quicker than the downstroke; also, in the arrangement of a clutch-bolt whereby the power is detached when the slide is at its highest elevation, and by the operation of which the power may be detached at every full movement of the slide; also, in the arrangement of a clutch-bolt and a lever, or its equivalent, whereby the power is detached at any given point or elevation.

To enable others skilled in the art to make and use my invention, I will proceed to describe the construction of the same.

A is the bed-plate; B, the frame supporting in proper guides, C C, the slide D. E is the driving-shaft supported in bearings F F; G, the pulley, a fly-wheel to which power is applied to drive the press in the usual manner. X is the punch, and Y the die-holder.

To the inner end of the driving-shaft I fix a pinion, H, which works into a gear, I. The said gear I is double the diameter of the pinion, and revolves on a fixed bearing, K. Through the said fixed bearing K, and above its center, in a perpendicular line, I insert a spindle, L, (see Fig. 2,) to which I fix a plate, P. The spindle and plate revolve freely in the bearing, and are turned by a pin or stud, *a*, on the gear I, working in a slot, *c*, in the plate P, (see Fig. 2,) so that as the gear revolves the plate and spindle turn with it, but each, the plate and gear on their respective centers, the pin or stud *a* moving in the slot *c* toward or from the center of the plate, as the radial line from the center of the plate to the pin decreases or increases in consequence of the eccentricity of the center of motion of the plate relatively to the center of the gear.

Outside the plate P, I fix a crank-pin, *d*, from which a pitman, M, connects with the slide D. As the said plate is made to revolve, as before described, its connection with the slide D will move the slide up and down at each revolution.

This completes the construction of the first part of my invention; and to fully illustrate its operation I introduce Figs. 3, 4, 5, and 6, which are diagrams, illustrating the movement, and showing the crank-pin *d* in its four positions, up, half-down, down, and half-up.

I represents the plate P with its crank-pin *d* and slot *c* and spindle I in black, the gear I with its stud *a* in red, and the fixed bearing K, around which the gear I revolves, in blue.

In Fig. 1 the plate P is represented as in the position when the crank-pin *d* is up. The slide D is of course in a corresponding position.

The slot *c* in the plate is formed at right angles to pin *d* and center of the plate P.

The pin *a* on the gear I works in the slot *c*, as before described.

In performing the first fourth part of a revolution of the plate in the direction denoted by arrow, or from the position in Fig. 3 to that in Fig. 4, the pin *a*, which moves the plate P, in consequence of the eccentricity of center of the plate to the center of the gear, will have passed to the most distant part of the slot *c*, and will also have passed through considerable more than one-fourth of its revolution, (about one-third,) as denoted by the radial lines. Continuing through a second fourth part of a revolution, or from the position denoted in Fig. 4 to that in Fig. 5, carries the pin *d*, and consequently the slide, to its lowest point, and the pin *a* will have passed through a like portion of its revolution (about one-third) as in the first fourth, and will also have traversed back in the slot *c* to the same position as at starting.

The third fourth part of a revolution of the plate P, or from the position in Fig. 5 to that in Fig. 6, the pin *a* will have traversed down to the inner extremity of the slot *c*, and the crank-pin *d* and slide will have risen one-half of its throw. Continuing the revolution the last fourth part, or to place of beginning, as in Fig. 3, one full movement of the slide or throw of the crank-pin has been made. As the velocity is governed by the gear I, whose movement is regular, the result is that while two-thirds of the time required for one revolution of the gear moves the plate P one-half its revolution, or from highest to lowest point, the other third only is occupied in turning the plate its other half-revolution, or from lowest to highest point. In common presses both movements are alike; therefore by my invention twenty-five per cent. of time is saved in each operation. By reversing or placing the pin *d* on the opposite side of the center of the plate the rapid stroke would be down and slow stroke up.

The pin *d* may be adjustably attached to the plate, so as to increase or decrease the length of stroke of the slide, and the difference of time in the up or down stroke will be in proportion as the spindle L is placed nearer or farther from the center of the gear. Concentric, of course they will revolve in like time. The farther from the center of the gear the spindle is set the greater will be this variation, provided always that the center of the spindle must come within the circle described by the pin *a* on the gear.

To connect or disconnect the power which forms the second part of my invention, the pulley G, which drives the machine, is fitted so as to turn loosely on the shaft E′. I form a groove in the shaft, into which I fit a bolt, *r*, so as to slide freely therein, making the bolt thicker than the depth of the groove, so as to project above the shaft, and when the bolt is moved or set into a notch, *n*, in the hub of the pulley, as in Fig. 2, the shaft will revolve with the pulley, and when the bolt is drawn out from the notch the pulley will revolve, while the shaft stands still. To operate the bolt, I hang a lever, N, on a fulcrum, *s*, (see Fig. 1,) upon which, and directly under the shaft E, I form a projection, P, and also form a notch, X, in the bolt *r*. (See Figs. 8 and 9). The lever is represented in Fig. 7 in black as down to connect the power, and in red as up to disconnect the power. When down, as in black, the shaft will revolve and the bolt clear the projection P on the lever, as in Fig. 8. A spring, *f*, forces the bolt into the notch of the pulley; but when the lever is allowed to rise, as in red, the notch on the bolt will catch upon the projection P of the lever. The said projection is made inclined upon its side for the purpose and draws the bolt from the pulley to release the power. The lever, when at rest, is held up by a spring or otherwise to hold the bolt back, so that when it is desired to connect the power draw down the lever, as in black, and also in Fig. 2.

To insure the disconnection at the time when the slide is up I fix a cam, S, to the spindle L of the plate, to revolve with it, of the form nearly as shown in Fig. 7 in black or red. The spindle revolves once while the shaft revolves twice. The cam in red stands in the position as when the slide is up, and the lever can rise high enough, as also in red, to engage in the bolt and hold it back.

To operate the press, draw down the lever from the position in red to that in black. The bolt being disengaged flies into the notch in the pulley to engage the power, as described. This forces the slide down. The cam will stand as in black, Fig. 7, and prevent the lever from rising until the slide has been carried up and the cam again in the position shown in red, at which point the lever can rise and disconnect the power. Thus, unless the lever is held down, the bolt cannot engage the power, excepting on the upward movement of the slide. If more than one operation of the slide is required, the lever must be held away accordingly by the operator, as for engaging the power in common presses.

Having fully described my invention, what I claim as new and useful, and desire to secure by Letters Patent, is—

1. The combination described of the gear I and plate P, or their equivalents, constructed and arranged to operate together, substantially as and for the purpose specified.

2. The combination of the cam S, lever N, and bolt *r* in the manner substantially as and for the purpose specified.

3. In combination with the bolt *r*, the lever N, or its equivalent, substantially in the manner specified, for the purpose of a "cut-off" or stop-motion.

CHARLES W. JOHNSON.

Witnesses:
GEO. E. TERRY,
JAS. R. AYRES.